UNITED STATES PATENT OFFICE.

ROMEDIUS PANZL, OF MERRITTON, CANADA.

COMPOSITION OF MATERIAL FOR LINING VESSELS USED FOR STORING OR BOILING CORROSIVE LIQUIDS.

SPECIFICATION forming part of Letters Patent No. 644,367, dated February 27, 1900.

Application filed March 25, 1898. Serial No. 675,107. (No specimens.)

*To all whom it may concern:*

Be it known that I, ROMEDIUS PANZL, residing at Merritton, county of Lincoln, Dominion of Canada, have invented certain new and useful Improvements in Composition of Material for Lining of Vessels Used for Storing or Boiling of Corrosive Liquids, of which the following is a specification.

My invention relates to acid-proofing of boilers, tanks, and other similar vessels and conduits used for storing, boiling, or conveying of corrosive liquids; and it consists of the hereinafter-described composition of material for lining the interior of such vessels as means of protecting the same against the action of such corrosive liquids. Such lining for boilers and tanks used for storing or boiling of corrosive chemicals as heretofore produced of hydraulic cement mixed with sand and of tiles applied thereon being from five to seven inches thick greatly diminishes the capacity of the vessel and is not absolutely impervious to such corrosive fluids. Superlining with glazed acid-proof tiles is not sufficient to protect the lining material from disintegration. Hydraulic cement and sand mixed with water do not unite so absolutely as to fully eliminate every particle of air, and the water used in mixing the dry ingredients is not fully absorbed chemically. The air and superfluous water cause what is known in the art as "blowing," (swelling and contracting of the mass,) whereby cavities and devices are formed in the body of the lining through which the corroding chemicals penetrate and destroy the body of the vessel or conduit. Having experimented extensively with the end in view to devise an acid-proof material for such linings which should be free from such defects, I have found that a composition of hydraulic or burnt cement, chamotte, and quartz, or some other silicious material, finely powdered and then mixed together with diluted silicate of soda, will produce a material that does not draw or crack when applied to the walls of the vessels in plastic state and which is absolutely impermeable to and proof against any corrosive fluid used or known in the arts. The proportion of these materials may be moderately varied, according to their qualities, from the following standard expressed in parts measured by volume: twenty-six parts of hydraulic cement, twelve parts of pulverized chamotte, seventeen parts of commercial silicate of soda, twenty-one parts of silicious material, (preferably pulverized quartz,) and twenty-four parts of pure water. In preparing this material the chamotte and quartz are finely pulverized and thoroughly mixed with the cement while yet dry. The silicate of soda is diluted by adding thereto the stated quantity of water. In preparing this latter ingredient of the composition a suitable boiler is filled with water, and the stated proportion of silicate of soda is successively added thereto while the water is boiling. The boiling is continued until the silicate of soda is fully assimilated with the water. The proportion may be varied according to the quality of the silicate of soda used; but it may be stated that the ordinary commercial silicate of soda will give the desired result if the proportion is made as stated above. The dry ingredients are moderately heated and mixed with the wet ingredients. While the mixing is being done, their temperature must be maintained slightly above 130° Fahrenheit to prevent baking of the material. The vessels containing the materials should be kept moderately heated, and the mixing should be done in a closed vessel.

The plastic mass produced by mixing the pulverized materials with the diluted silicate of soda is applied while yet hot to the vessel to be lined. While this is being done, the vessel must not, however, be warm, and if the lining, for instance, of a boiler is being done while other adjacent boilers are in operation the boiler must be cooled during the operation by spraying it with cold water from the outside, by covering it with wet rags, or in other suitable manner. The surface to which the lining is to be applied must be thoroughly cleaned and the "first layer," as I term it, rubbed in. This is necessary to produce an intimate connection between the lining and the wall of the vessel. The lining material sticks readily. It is applied in successive layers until the desired thickness of the lining is obtained. The work must be done rapidly to insure a proper unification of all successive layers. When the required thickness of lining is obtained, its surface is Chamotte – ... Pottery
Old crucibles etc.
See also Technologisches Wörterbuch evened by suitable tools and cooled off by a spray of cold water or by covering it with wet rags to facilitate a steady progress of the hardening process. When the lining is completed, the vessel can be put to its use immediately. If this, however, is not done, the vessel ought to be partly filled with water, which is to be kept moderately heated until the lining is fully hardened. When finished, the surface of the lining is perfectly smooth and will safely withstand any use to which the vessel may be put. No other covering, such as tiles, is necessary even for boilers wherein the boiling material is to be agitated by mechanical device. A lining composed of the described material and applied in the described manner is practically indestructible. It will withstand the action of any corrosive fluids, even the fumes of concentrated sulfuric or nitric acid, and will not crack.

If superlining with tiles is required, such tiles may be applied immediately upon the lining. No other binding material is necessary between the lining and the tiles, and crevices between the adjoining tiles are filled and the tiles are cemented together with the same material as used for the lining. The tiles are applied in similar manner to round vessels.

If quartz is not obtainable, then pulverized glass (twelve per cent.) and slate (nine per cent.) may be used instead. The lining composed of material containing pulverized glass and slate in place of quartz is equally proof against corrosive fluids, though less compact and hard, and consequently less capable to resist abrasion. For lining of boilers or pulp-digesters, wherein the boiling mass is thrown with considerable force and velocity against the walls, the material composed of cement, chamotte, and quartz is better suitable than the substitute containing glass and slate.

The above-described composition of material is suitable also for another use. It is often necessary to divide a tank or other vessel for holding of corrosive fluids in two or more compartments. Such partition-walls were heretofore made of the same material as the vessel and then lined on both sides. By making use of my invention any tank may be divided into as many compartments as may be required by erecting a grate of bars or stretching a strip of suitably-strong wire-netting where a partition is to be constructed and then applying the lining material to it. When sufficient thickness is obtained, the surfaces of the partition-wall are finished on both sides. Such partition-wall will be found sufficiently strong for all purposes. The grate or netting serves to sustain the wall and secure it against breaking. Such combination of my improved lining material with a grate or wire-netting may be used for constructing tanks independently of any other material in such manner that instead of lining a tank the tank may be constructed of the lining material applied upon a grate or netting of wire or other suitable material. For such purpose a suitably-shaped grate of iron bars about one-fourth to one-half of an inch thick, fastened together by ties of wire, is used. This grate is set up in wooden planking of somewhat-larger dimensions, and the material is applied to it. The wooden planking is removed after the plastic material hardens. Any tank thus constructed is absolutely safe, and even boilers exposed to comparatively-high pressure may be thus built with safety if the wooden planking is retained and bound together by iron bands.

I claim as my invention and desire to secure by Letters Patent—

1. A composition of matter for acid-proof lining of boilers, tanks and similar vessels, composed of hydraulic cement, chamotte, some silicious material, water and silicate of soda.

2. A composition of matter for acid-proof lining of boilers, tanks, and similar vessels, composed of hydraulic cement, pulverized chamotte and quartz and of diluted silicate of soda.

3. A composition of matter for acid-proof lining of boilers, tanks, and similar vessels, composed of twenty-six per cent. of hydraulic cement, twelve per cent. chamotte, twenty-one per cent. of quartz and of a suitable quantity of diluted silicate of soda.

ROMEDIUS PANZL.

Witnesses:
FRANK KOVEK,
VINCENT GUSTIN.

Norton, 480,934, Aug. 16, 1892, Digesters
Curtis et al., 484,999, Oct. 25, 1892, "
Jurschina, 379,580, Mar. 20, 888, Class 106. Comp.
German patents: Jung et al., 47,976, July 1, 1889, Digesters
Baerwaldt, 70,477, July 25, 1893,
Brit. pat. Kellner, 4959 of 1890, Digesters.
Schmidt, 291,091, Jan. 1, 1884, Masonry, Cisterns,
Monier, 486,535, Nov. 22, 1892